US012142106B2

(12) United States Patent
Marsh et al.

(10) Patent No.: US 12,142,106 B2
(45) **Date of Patent: *Nov. 12, 2024**

(54) GAMEPLAY METHOD WITH CONNECTED IMAGE SEGMENTS

(71) Applicant: Aristocrat Technologies Australia Pty Limited, North Ryde (AU)

(72) Inventors: David Marsh, Charlottesville, VA (US); Karl Roelofs, Charlottesville, VA (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,833

(22) Filed: Aug. 30, 2023

(65) Prior Publication Data

US 2023/0401923 A1 Dec. 14, 2023

Related U.S. Application Data

(63) Continuation of application No. 17/747,605, filed on May 18, 2022, now Pat. No. 11,783,664, which is a (Continued)

(51) Int. Cl.
*G07F 17/32* (2006.01)
*G07F 17/34* (2006.01)

(52) U.S. Cl.
CPC ........ *G07F 17/3213* (2013.01); *G07F 17/323* (2013.01); *G07F 17/34* (2013.01)

(58) Field of Classification Search
CPC ............. G07F 17/3213; G07F 17/3269; G07F 17/323; G07F 17/34
See application file for complete search history.

(56) References Cited

U.S. PATENT DOCUMENTS 6,761,633 B2 7/2004 Riendeau
7,674,176 B2 3/2010 Berman
(Continued)

OTHER PUBLICATIONS

Notice of Allowance dated Mar. 24, 2020, for U.S. Appl. No. 15/926,905 (pp. 1-11).
(Continued)

*Primary Examiner* — Chase E Leichliter
(74) *Attorney, Agent, or Firm* — McAndrews, Held & Malloy, Ltd.

(57) ABSTRACT

Wagering gaming systems, devices, and methods are presented. A gaming device includes a credit input mechanism, a player interface mechanism, a display, and a controller. The credit input mechanism receives a physical item representing a monetary value and increases a credit balance of a credit meter based on the monetary value of the received physical item. The display includes symbol positions arranged in an array of rows and columns. During game play, the controller is further configured to display symbols selected from the set of symbols on the array. The symbol set includes a plurality of image segments that form a contiguous image when they are displayed in a predetermined arrangement on the array of symbol positions. The controller makes an award or triggers an event, such as a bonus game, if the displayed symbols include the plurality of image segments arranged to display the contiguous image. Numerous additional aspects are disclosed.

20 Claims, 13 Drawing Sheets

Related U.S. Application Data continuation of application No. 16/931,290, filed on Jul. 16, 2020, now Pat. No. 11,341,804, which is a continuation of application No. 15/926,905, filed on Mar. 20, 2018, now Pat. No. 10,726,661.

(56) References Cited

U.S. PATENT DOCUMENTS

| | | | | | |
|---|---|---|---|---|---|
| 8,007,358 | B2* | 8/2011 | Linard | G07F 17/3295 | 463/16 |
| 9,028,318 | B2 | 5/2015 | Caputo | | |
| 9,039,512 | B2 | 5/2015 | Caputo | | |
| 9,214,067 | B2* | 12/2015 | Basallo | G07F 17/34 | |
| 9,600,979 | B2 | 3/2017 | Hornik | | |
| 10,726,661 | B2* | 7/2020 | Marsh | G07F 17/34 | |
| 11,341,804 | B2* | 5/2022 | Marsh | G07F 17/34 | |
| 11,783,664 | B2* | 10/2023 | Marsh | G07F 17/3213 | 463/20 |
| 2003/0017865 | A1* | 1/2003 | Beaulieu | G07F 17/3213 | 463/16 |
| 2004/0127282 | A1* | 7/2004 | Naobayashi | G07F 17/32 | 463/20 |
| 2004/0137981 | A1 | 7/2004 | Gauselmann | | |
| 2006/0003832 | A1* | 1/2006 | Mincey | G07F 17/3267 | 463/20 |
| 2006/0079313 | A1* | 4/2006 | Trainor | G07F 17/3244 | 463/20 |
| 2007/0060249 | A1* | 3/2007 | Gomez | G07F 17/32 | 463/16 |
| 2007/0142108 | A1* | 6/2007 | Linard | A63F 13/10 | 463/22 |
| 2007/0265053 | A1 | 11/2007 | Linard | | |
| 2008/0058082 | A1* | 3/2008 | Kido | G07F 17/34 | 463/20 |
| 2008/0096639 | A1* | 4/2008 | Okada | G07F 17/34 | 463/20 |
| 2011/0201403 | A1* | 8/2011 | Jaffe | G07F 17/34 | 463/20 |
| 2011/0281640 | A1* | 11/2011 | White | G07F 17/3246 | 463/25 |
| 2013/0029746 | A1* | 1/2013 | Watkins | G07F 17/3267 | 463/20 |
| 2013/0217464 | A1* | 8/2013 | Terdina | G07F 17/3288 | 463/20 |
| 2013/0331167 | A1* | 12/2013 | Meistrich | G07F 17/34 | 463/20 |
| 2014/0148230 | A1* | 5/2014 | Guase | G07F 17/3274 | 463/20 |
| 2016/0171818 | A1* | 6/2016 | Mills | G07F 17/326 | 463/20 |
| 2017/0165573 | A1* | 6/2017 | Froy | G07F 17/3206 | |
| 2019/0295360 | A1* | 9/2019 | Marsh | G07F 17/34 | |
| 2020/0226884 | A1* | 7/2020 | Grotte | G07F 17/34 | |
| 2020/0349802 | A1* | 11/2020 | Marsh | G07F 17/3213 | |
| 2022/0277615 | A1* | 9/2022 | Marsh | G07F 17/323 | |
| 2023/0401923 | A1* | 12/2023 | Marsh | G07F 17/34 | |

OTHER PUBLICATIONS

Office Action (Non-Final Rejection) dated Sep. 15, 2021 for U.S. Appl. No. 16/931,290 (pp. 1-9).

Office Action (Notice of Allowance and Fees Due (PTOL-85)) dated Jan. 27, 2022 for U.S. Appl. No. 16/931,290 (pp. 1-8).

Office Action (Non-Final Rejection) dated Feb. 2, 2023 for U.S. Appl. No. 17/747,605 (pp. 1-12).

Office Action (Notice of Allowance and Fees Due (PTOL-85)) dated Jun. 1, 2023 for U.S. Appl. No. 17/747,605 (pp. 1-8).

WMS Gaming, Dragon Mistress Video Slot, 2015, https://www.youtube.com/watch?v=QemsSe_JHL8.

Australian Examination Report No. 1 issued in App. No. AU2019201675, dated Dec. 21, 2023, 3 pages.

* cited by examiner

GAMEPLAY METHOD WITH CONNECTED IMAGE SEGMENTS

RELATED APPLICATIONS

The present application is a continuation of and claims priority to U.S. patent application Ser. No. 17/747,605, filed May 18, 2022, which is a continuation application of U.S. patent application Ser. No. 16/931,290, filed Jul. 16, 2020, issued on May 24, 2022 as U.S. Pat. No. 11,341,804, and entitled "A Gameplay Method with Connected Image Segments" which is a continuation application of U.S. patent application Ser. No. 15/926,905, filed Mar. 20, 2018, issued on Jul. 28, 2020 as U.S. Pat. No. 10,726,661, and entitled "A Gameplay Method with Connected Image Segments" both of which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

The popularity of such gaming machines with players is heavily dependent on the entertainment value of the machine relative to other gaming options. Operators of gaming businesses therefore strive to provide the most entertaining, engaging, and exciting machines to attract customers to use the machines and increase profitability to the operator. Accordingly, there is a continuing need for gaming machine manufacturers to develop new games in order to maintain or increase player enjoyment.

SUMMARY

In some embodiments, a gaming system is provided. The gaming system may include a credit input mechanism, a player interface mechanism, a display, and a controller. The credit input mechanism is configured to receive a physical item associated with a monetary value for establishing a credit balance that is increasable and decreasable based on wagering activity. The player interface allows a player to place one or more wagers using the credit balance. The display has a plurality of symbol positions arranged in an array that includes a plurality of rows and columns. The gaming system's controller conducts casino wagering games in response to wager inputs received via the player interface. In conducting the games, the controller is configured to display symbols selected from a symbol set on the array of symbol positions. The symbol set includes a plurality of image segments that form a contiguous image when they are displayed in a predetermined arrangement on the array of symbol positions. The controller determines if the displayed symbols include the plurality of image segments arranged to display the contiguous image. The controller is further configured to make an award upon determining that the displayed symbols include the image segments correctly arranged to display the contiguous image.

Some other embodiments relate to a method of operating a gaming machine of the type comprising a credit input mechanism, a player interface mechanism, a display, and a controller. The credit input mechanism is configured to receive a physical item associated with a monetary value for establishing a credit balance that is increasable and decreasable based on wagering activity. The player interface allows a player to place one or more wagers using the credit balance. The display has a plurality of symbol positions arranged in an array that includes a plurality of rows and columns. The method includes, initiating a wagering game, via the controller, in response to receiving a wager input from the player interface. The method also includes displaying symbols selected from a symbol set on the array of symbol positions. The symbol set includes a plurality of image segments that form a contiguous image when they are displayed in a predetermined arrangement on the array of symbol positions. The method further includes determining, via the controller, if the displayed symbols include the plurality of image segments arranged to display the contiguous image. In addition, the method includes making an award upon determining that the displayed symbols include the image segments arranged to display the contiguous image.

Certain other embodiments relate to a gaming machine that includes a cabinet, a credit input mechanism, a player interface mechanism, a display, and a controller. The credit input mechanism is carried by the cabinet and is accessible by a player. The credit input mechanism is configured to receive a physical item associated with a monetary value for establishing a credit balance that is increasable and decreasable based on wagering activity. The player interface is carried by the cabinet and configured to allow a player to place one or more wagers using the credit balance. The display carried is by the cabinet and is viewable by a player.

The display comprising a plurality of symbol positions arranged in an array of rows and columns. The gaming machine's controller is contained in the cabinet and is configured to initiate a wagering game in response to receiving a wager input from the player interface. The controller is further configured to display symbols selected from a symbol set on the array of symbol positions. The symbol set includes a plurality of image segments that form a contiguous image when they are displayed in a predetermined arrangement on the array of symbol positions. The controller also determines if the displayed symbols include the plurality of image segments arranged to display the contiguous image. The controller further makes an award upon determining that the displayed symbols include the image segments arranged to display the contiguous image.

According to further aspects of at least some embodiments, the display comprises N columns and the contiguous image is formed when N image segments are displayed in a predefined order on the display with each of the image segments being displayed in a different one of the columns. In certain embodiments, the contiguous image is formed when the N image segments are displayed in the predefined order across a single row of the display.

In at least some embodiments, the controller is configured to displaying an animation of the contiguous image to reveal an award. In some embodiments, the animation moves sequentially across the screen from a leftmost image segment to a rightmost image segment.

Still other features, aspects, and advantages of embodiments will become more fully apparent from the following detailed description, the appended claims, and the accompanying drawings illustrating a number of example embodiments and implementations, including the best mode contemplated for carrying out the embodiments. Embodiments may also be capable of other and different applications, and several details may be modified in various respects, all without departing from the spirit and scope of the disclosed embodiments. Accordingly, the drawings and descriptions are to be regarded as illustrative in nature, and not as restrictive. The drawings are not necessarily drawn to scale.

BRIEF DESCRIPTION OF THE DRAWINGS

In the drawings, various dimensions may be exaggerated for illustrative clarity. Additionally, like reference numbers are utilized to refer to like elements throughout the present disclosure.

DETAILED DESCRIPTION

Figure 1:
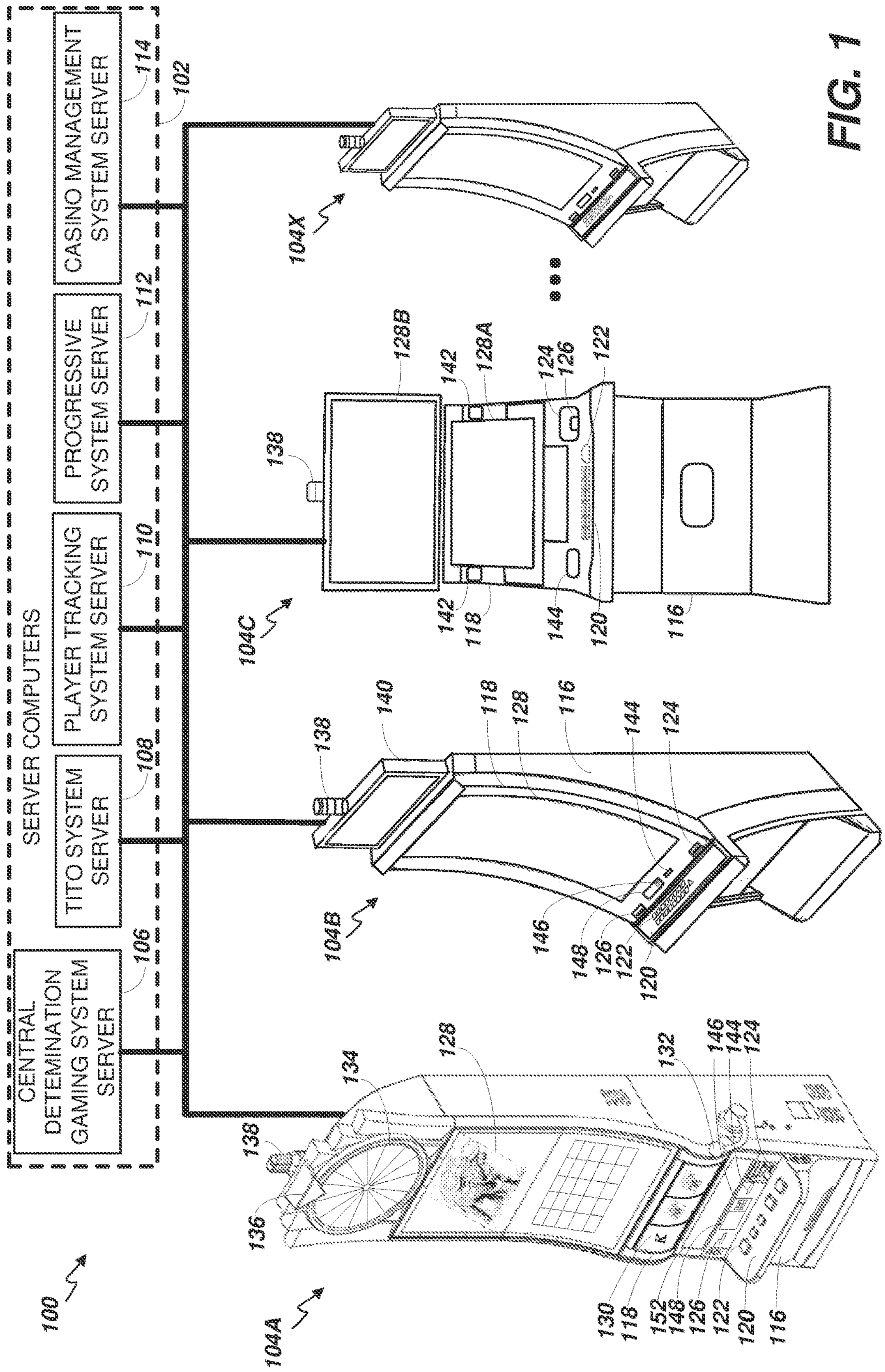
FIG. 1 is an exemplary diagram showing several EGMs networked with various gaming related servers.

The following description presents various aspects of the present disclosure by way of various examples and example embodiments. Such examples and example embodiments are intended to be non-limiting. Thus, the scope of various aspects of the present disclosure should not necessarily be limited by any particular characteristics of the presented examples and example embodiments. In particular, the phrases "for example," "e.g.," and "exemplary" are intended to be non-limiting in nature and are generally synonymous with "by way of example and not limitation," "for example and not limitation," and the like.

Various aspects of the present disclosure are directed to gaming systems and game devices where a plurality of symbols are displayed on an array or matrix of symbol positions to define game outcomes. In at least some embodiments, the array has a predetermined number or rows, e.g., 3, and a predetermined number of columns, e.g., 5, which present a 3×5 array of symbols. The display array may be provided in the context of a spinning reel game, where each column corresponds to a different reel. In such embodiments, the gaming device may spin the reels (either mechanically or virtually) and may stop each reel in a randomly determined position to obtain a game outcome comprising the array of symbols. The gaming device may then analyze the array of symbols to determine whether the array of symbols includes one or more winning combination of symbols.

The symbols may include a plurality of game symbols that may, for example, correspond to individual cards for a deck of playing cards. Winning outcomes may be based on card hands, e.g., two of a kind, flushes, straights, etc. The gaming device may increase a credit meter by a number of credits specified in a pay table for the winning combination of symbols.

The symbols also include a plurality of image segments that a form a contiguous image when they are displayed in a predetermined arrangement on the array of symbols. For example, the contiguous image may show a burning fuse in the leftmost column that interconnects with a bomb in the rightmost column by sections of fuse in the middle columns. A winning outcome occurs when the image segments align on the symbol array to display the contiguous image. In some embodiments, the contiguous image is created when the image segments align across a single row of the array of symbols. In other embodiments, the contiguous image may be created by image segments from different rows and columns. The winning outcome may result in an award, e.g., credits, a fixed prize, a bonus game, etc. An animation may be provided to reveal the award. For example, the animation may show the fuse burning across the screen until it reaches the bomb, which causes the bomb to detonate and reveal the award. A wide variety of art themes may be employed in connection with the contiguous image, including for example, water pipes, roads, electrical circuitry, train tracks, a firefighter hose, landscapes, skylines, etc.

Various advantages and features of the present disclosure will become apparent and more clearly understood in view of the detailed description, appended claims, and drawings of the present disclosure. In the following description, reference is made to drawings which show, by way of illustration, various disclosed embodiments that incorporate various aspects of the present disclosure. These embodiments are described in sufficient detail to enable those skilled in the art to make or use the disclosed embodiments. Other embodiments may be utilized so that structural, logical, software, hardware, and electrical changes may be made without departing from the scope of the appended claims. The following description is, therefore, not to be taken in a limited sense.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
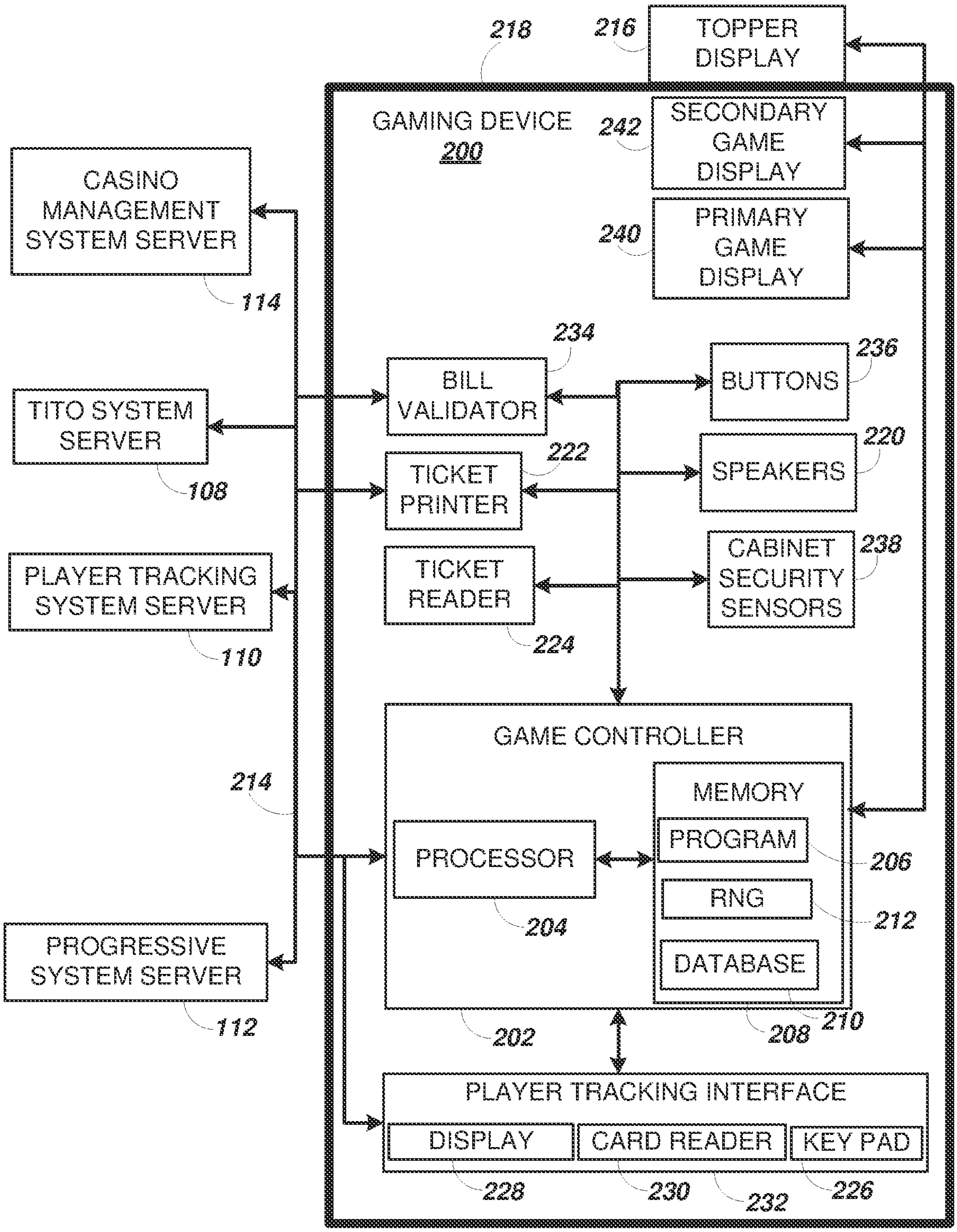
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

While an example gaming device 200 has been described in regard to FIG. 2, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having a mechanical reels or a video display. Moreover, other embodiments may be designed for bar tables and have displays that face upwards.

Many different types of wagering games, including mechanical slot games, video slot games, video poker, video black jack, video pachinko, keno, bingo, and lottery, may be provided by the gaming device 200. In particular, a gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select from the list a game that they wish to play.

Reel Arrangement

As explained above, the gaming device 200, in some embodiments, does not include physical or mechanical reels. In such embodiments, the gaming device 200 may display game play functions such as, for example, the spinning of reels via a video display of the primary game display 240. While the gaming device 200 may simulate or animate spinning reels via primary game display 240, the below description does not distinguish between animated reels and mechanical reels. Unless otherwise explicitly specified in the below description or in the appended claims, the contiguous image aspects of the present disclosure are applicable to animated reels as well as mechanical reels.

Figure 3:
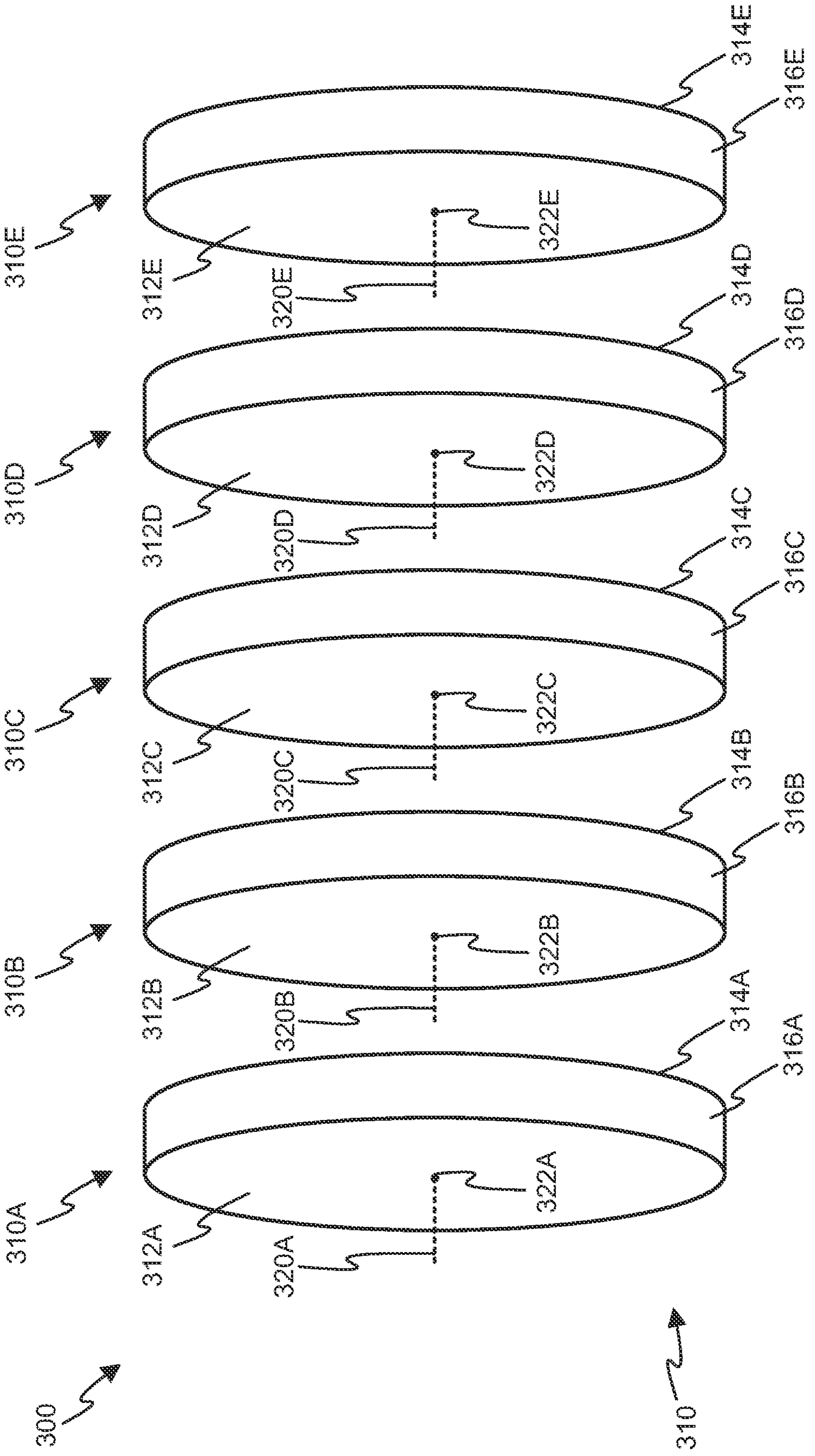
FIG. 3 depicts an exemplary reel arrangement of the EGM of FIG. 2.

Referring now to FIG. 3, an exemplary arrangement 300 of reels 310 is presented. Such depiction of reels 310 is generally applicable to the reels 310 of the gaming device 200 regardless of whether the reels 310 are implemented as mechanical reels or as a simulation or animation of reels displayed upon a video display of the primary game display 240.

As shown, the arrangement 300 may include five reels 310A, 310B, 310C, 310D, 310E, though arrangements having a different number of reels 310 (e.g., three, four, etc.) are contemplated. In the exemplary arrangement 300, each reel 310A 310E may have a cylindrical shape comprising circular ends 312A 312E, 314A 314E connected by a cylindrical outer surface 316A 316E. However, other embodiments of reels 310A 310E may utilize a different cylindrical shape in which the ends 312A 312E do not have circular shape but instead have a regular polygonal shape or have another shape. As further shown, each reel 310A 310E includes an axis of rotation 320A 320E that passes through a central point 322A 322E of ends 312A 312E. The reels 310A 310E may be positioned in a side by side manner across the primary game display 240 such that their axes of rotation 320A 320E are arranged along a common axis that spans horizontally across the primary game display 240.

Each reel 310A 310E may further carry symbols along its outer surface 316A 316E. In particular, the outer surface 316A 316E of each reel 310A 310E may carry symbols selected from a set of symbols. For example, the outer surfaces 316A 316E may carry many symbols (e.g., twenty two or more), but may present only a small subset of such symbols to the player via the primary game display 240. Such an arrangement 300 of reels 310A 310E results in the outer surface 316A 316E of each reel 310A 310E presenting a column of symbols to the player. Thus, in the depicted five reel arrangement 300, the reels 310A 310E may present five columns of symbols.

Referring additionally now to FIGS. 4A-4H, further details regarding symbols presented by the reels 310A 310E are depicted. As noted above, the outer surfaces 316A 316E may carry many symbols, but may present only a small subset of such symbols to the player via the primary game display 240. To this end, the reels 310A 310E may be physically masked or otherwise implemented such that each reel 310A 310E presents a relatively small number (e.g., three) of display positions to the player when the reels are stopped or otherwise at rest. For example, the first reel 310A may provide three vertically disposed display positions 310A1, 310A2, 310A3; the second reel 310B may provide three vertically disposed display positions 310B1, 310B2, 310B3; the third reel 310C may provide three vertically disposed display positions 310C1, 310C2, 310C3; the fourth reel 310D may provide three vertically disposed display positions 310D1, 310D2, 310D3; and the fifth reel 310E may provide three vertically disposed display positions 310E1, 310E2, 310E3.

As a result of such arrangement, the primary game display 240 may present a 3×5 symbol array 330 with three rows and five columns of symbol display positions. While a 3×5 symbol array 330 is shown, other embodiments may include a fewer number of reels/columns (e.g., three reels total) or a greater number of reels/columns (e.g., six reels total) and/or rows may be provided. Furthermore, each reel may include a different number of display positions. Moreover, while each reel 310A 310E may present the same number of symbols (e.g., three), embodiments in which not all of the reels 310A 310E present the same number of symbols are contemplated. For example, the central reel 310C in some embodiments may provide a greater number of display positions (e.g., four) than the other reels 310A, 310B, 310D, 310E.

Moreover, while the symbol array 330 is described in the context of a spinning reel game, it will be appreciated that symbol array 330 may be used in other types of games. For example, particularly in the context of a video display, the symbol array 330 may be presented and populated by symbols without providing any representation of reels spinning.

Game Symbols and Paylines

As just described, various aspects of the present disclosure are directed to gaming devices where a plurality of symbols are displayed on a symbol array 330 or a matrix of symbol positions to define game outcomes. In some embodiments, the symbol array 330 may be populated with symbols by spinning and stopping a plurality of mechanical or virtual reels. In certain other embodiments, the symbol array 330 may be electronically displayed and populated. Once the array 330 is populated with symbols, the gaming device may then analyze the symbol array to determine if it contains one or more winning combinations of symbols.

The symbol set may include a plurality of game symbols (e.g., individual cards for a deck of playing cards, letters, cherries, bars, double bars, triple bars, sevens, wilds, scatter, etc.). For example, in some embodiments the game symbols may correspond to individual cards for a deck of playing cards and winning outcomes may be based on card hands, e.g., two of a kind, flushes, straights, etc. The gaming device 200 may increase a credit meter by a number of credits specified in a pay table for the winning combination of symbols.

The gaming device 200 may utilize one or more paylines to determine whether the symbol array 330 contains a winning symbol combination or whether the symbol array 330 contains symbols that trigger a game event. In particular, a gaming device 200 may provide one or more paylines and may allow the player to make a wager on each payline in a play of the primary game. For example, the gaming device 200 may include 1, 3, 5, 9, 15, 25, or some other number of paylines upon which the player may wager or otherwise activate. The gaming device 200 may allow players to make wagers of substantially different amounts on each play of the primary or base game ranging, for example, from one credit up to 125 credits (e.g., five credits on each of 25 separate paylines).

Figure 4A:
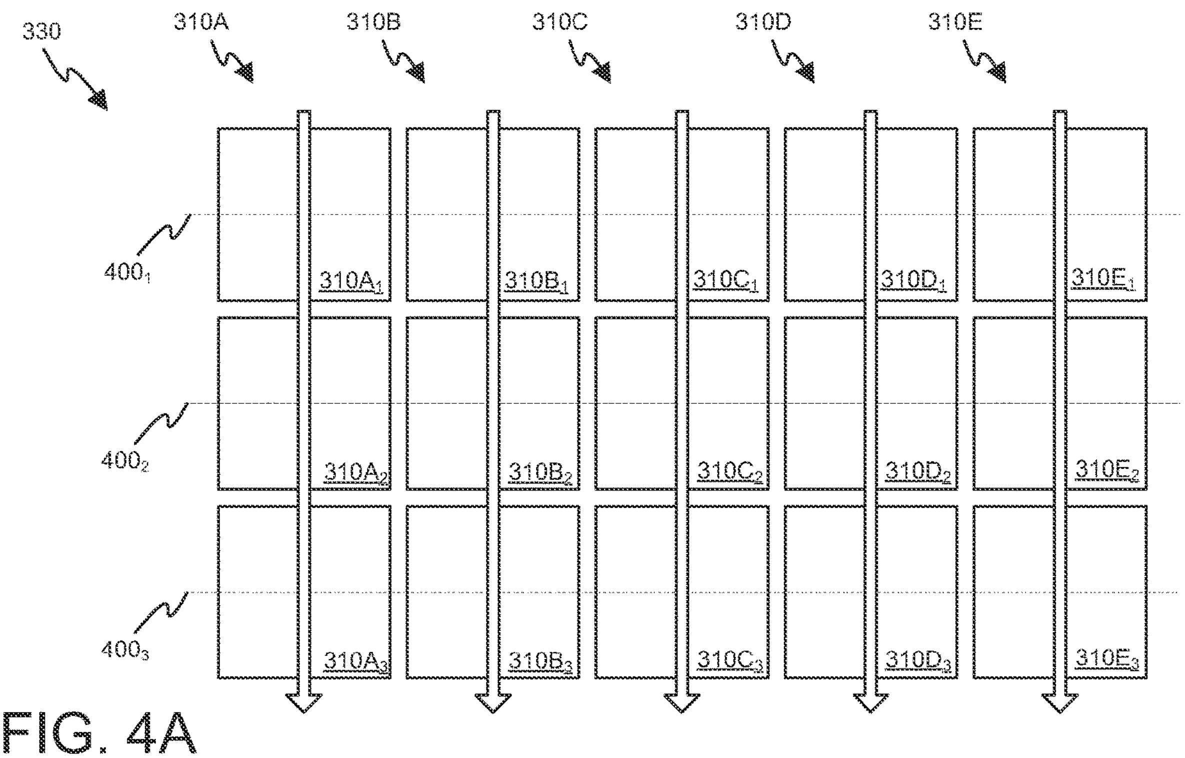
FIGS. 4A-4H are images of exemplary screens of a wagering game displayed on the EGM of FIG. 2 according to an embodiment the present disclosure.
Figure 4B:
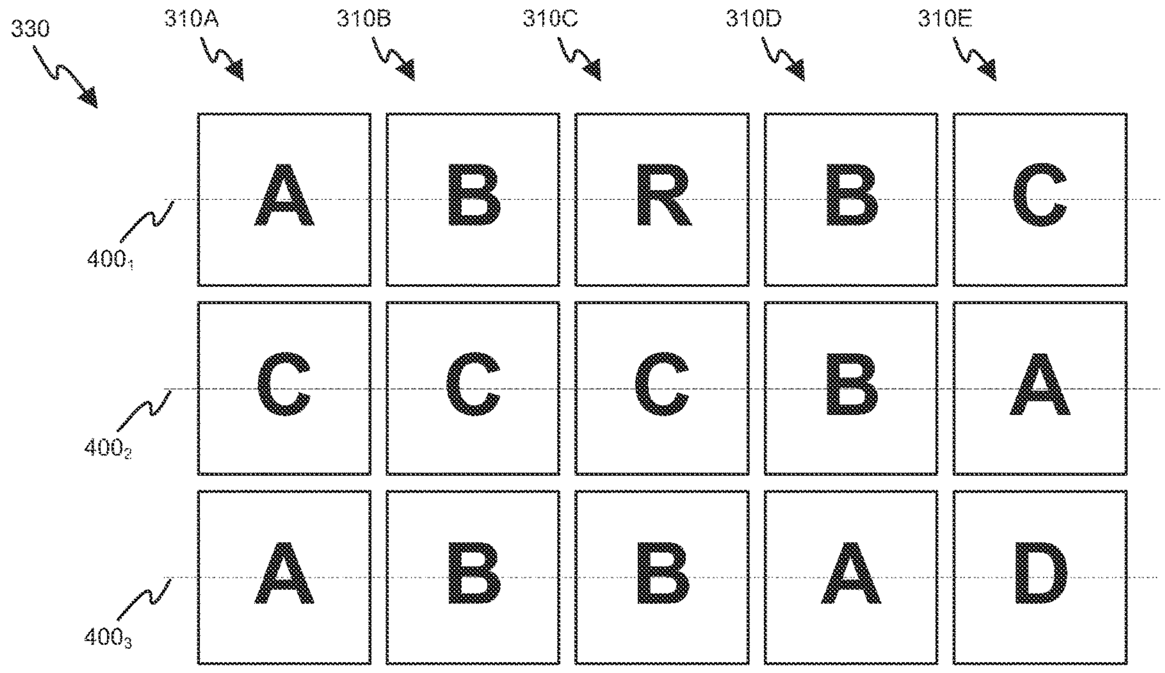
Figure 4C:
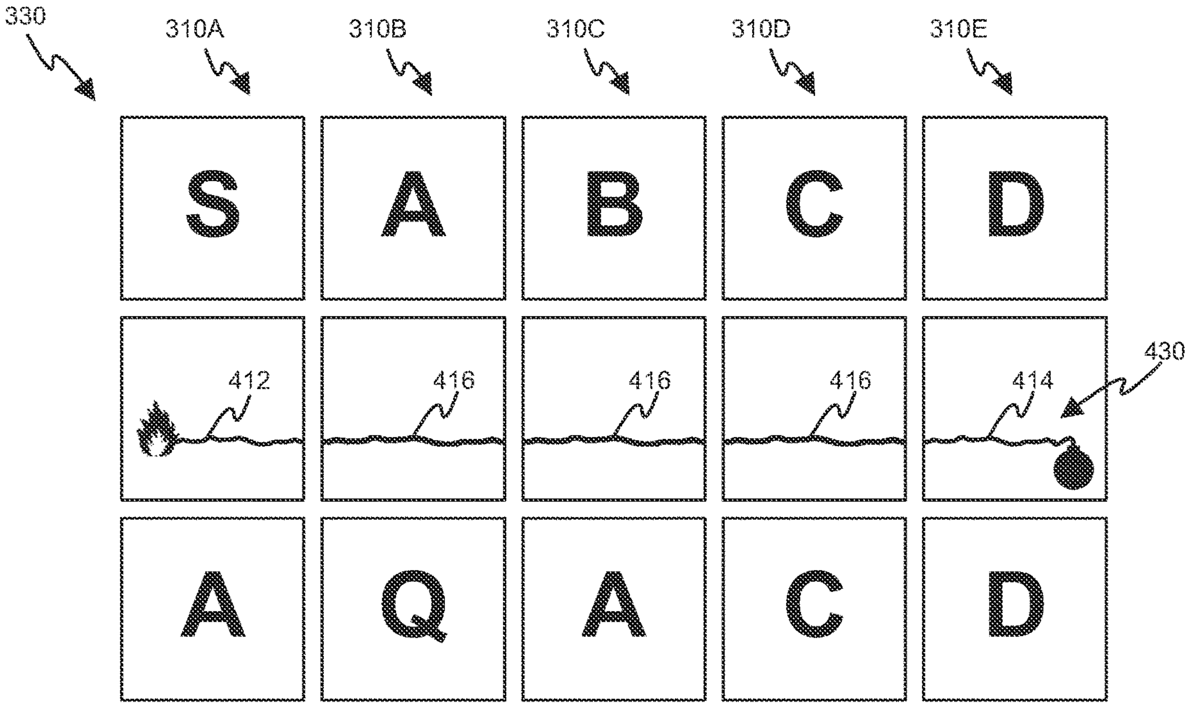

The paylines may be horizontal (see, e.g., paylines 4001, 4002, 4003 of FIGS. 4A and 4B), vertical, circular, diagonal, angled, zigzagged, or any combination thereof. Each payline identifies a subset of symbols or display positions of the symbol array 330. For example, FIGS. 4A 4H depict an embodiment having three horizontal paylines 4001, 4002, 4003. The top payline 4001 corresponds to the top row of display positions 310A1, 310B1, 310C1, 310D1, 310E1. The center payline 4002 corresponds to the center row of display positions 310A2, 310B2, 310C2, 310D2, 310E2. The bottom payline 4003 corresponds to the bottom row of display positions 310A3, 310B3, 310C3, 310D3, 310E3. In some embodiments, the paylines 4001, 4002, 4003 are selectively activated based on, for example, a player's wager or gaming outcomes. In such embodiments, the gaming device 200 may only award prizes or trigger game events based on symbols aligned with activated paylines 4001, 4002, 4003.

Contiguous Image Feature

The set of symbols also includes a plurality of image segments that form a contiguous image when they are displayed in a predetermined arrangement on the symbol array 330. A wide variety of art themes may be employed in connection with the contiguous image, including, for example, water pipes, roads, electrical circuitry, train tracks, a firefighter hose, landscapes, skylines, etc.

In the exemplary embodiment of FIGS. 4A-4H, the contiguous image is depicted as a bomb with a burning fuse. In this embodiment, the image segments may include burning fuse segments 412, bomb image segments 414, and non-burning fuse segments (including, for example horizontal fuse image segments 416, vertical fuse image segments 418, non-linear fuse image segments 420, and diagonal fuse image segments 422). In the embodiment depicted in FIGS. 4A-4H, each display position 310A1-310E3 of the array 330 displays a single game symbol or image segment. However, in some embodiments (see, e.g., FIGS. 7A and 7B), the display positions 310A1-310E3 may simultaneously display both a game symbol and an image segment.

In some embodiments, a contiguous image may be formed when the image segments are sequentially aligned along a single row of the display. For example, FIG. 4C illustrates an exemplary embodiment of a contiguous image 430 consisting of a burning fuse image segment on the first reel 310A interconnected to a bomb image segment 414 on the fifth reel 310E by horizontal fuse image segments 416 displayed on the three middle reels 310B, 310C, 310D.

Figure 4D:
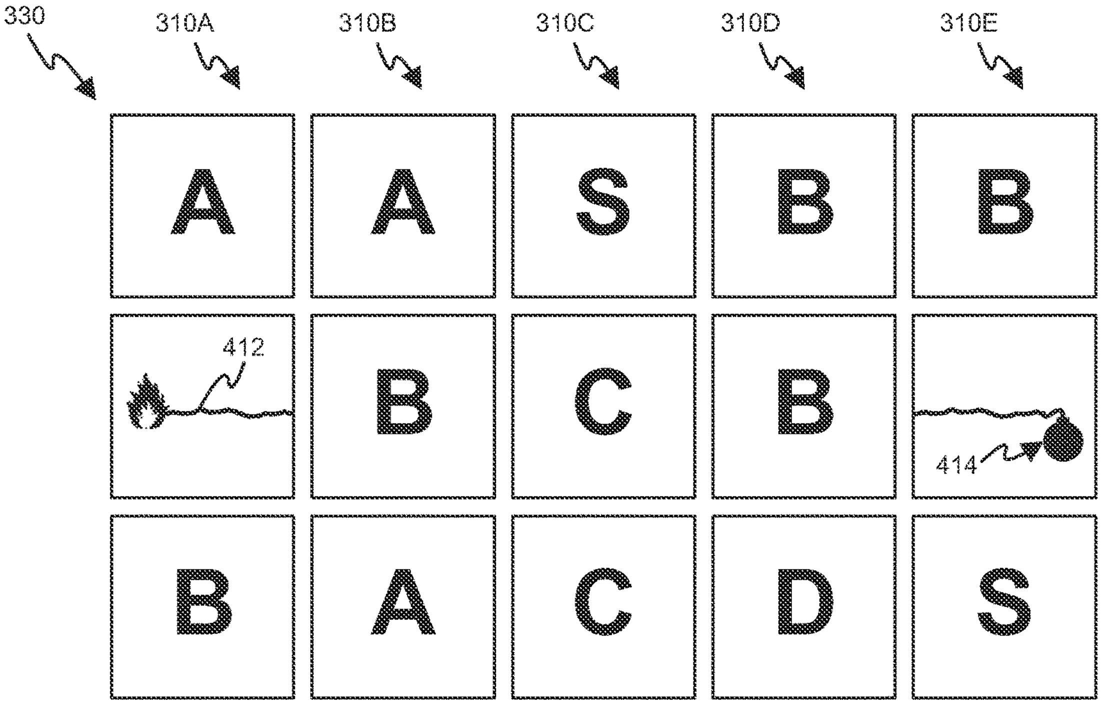
Figure 4E:
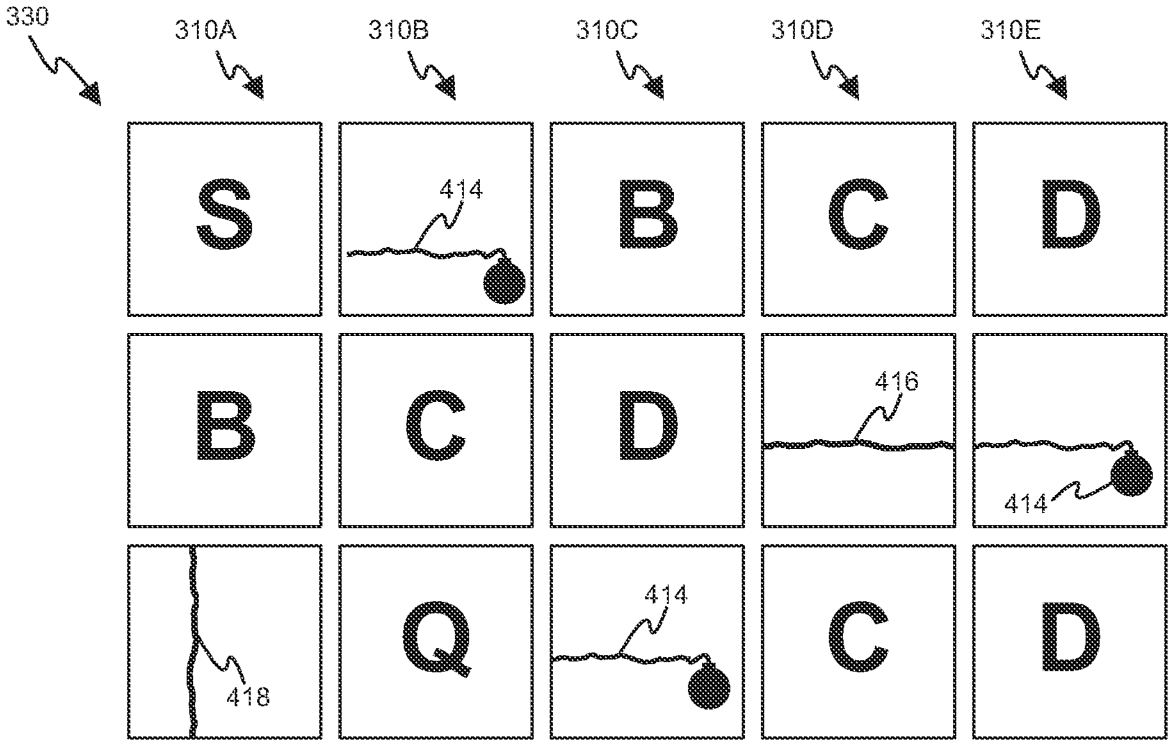

FIGS. 4D-4E show the symbol array 330 in instances in which image segments are displayed without forming a contiguous image. As a result, although winning outcomes might be paid based on game symbol combinations, no winning outcome would be awarded in these instances based on the contiguous image feature.

Figure 4F:
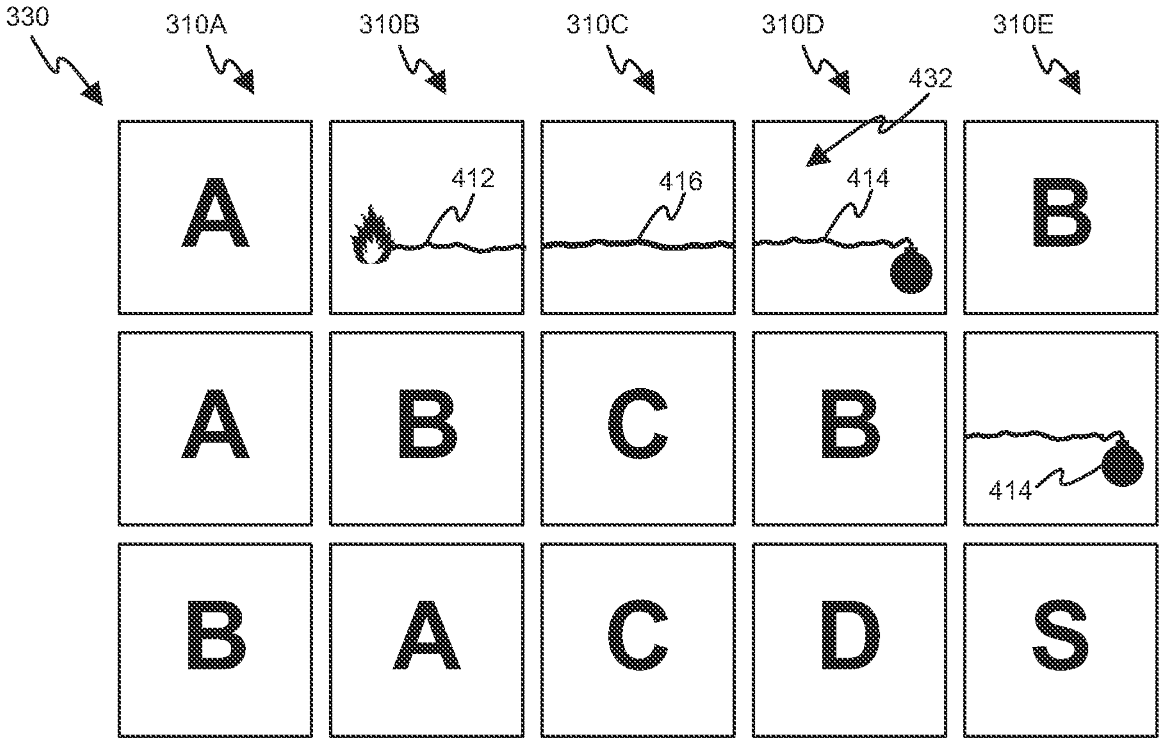

FIG. 4F illustrates another exemplary embodiment of a contiguous image 432. In this embodiment, the contiguous image 432 is formed by image segments displayed on fewer than all of the reels. In particular, the composite image 432 is formed by a burning fuse image segment on the second reel 310B, a non-burning horizontal fuse image segment 416 on the third reel 310C, and a bomb image segment 414 on the third reel 310D.

Figure 4G:
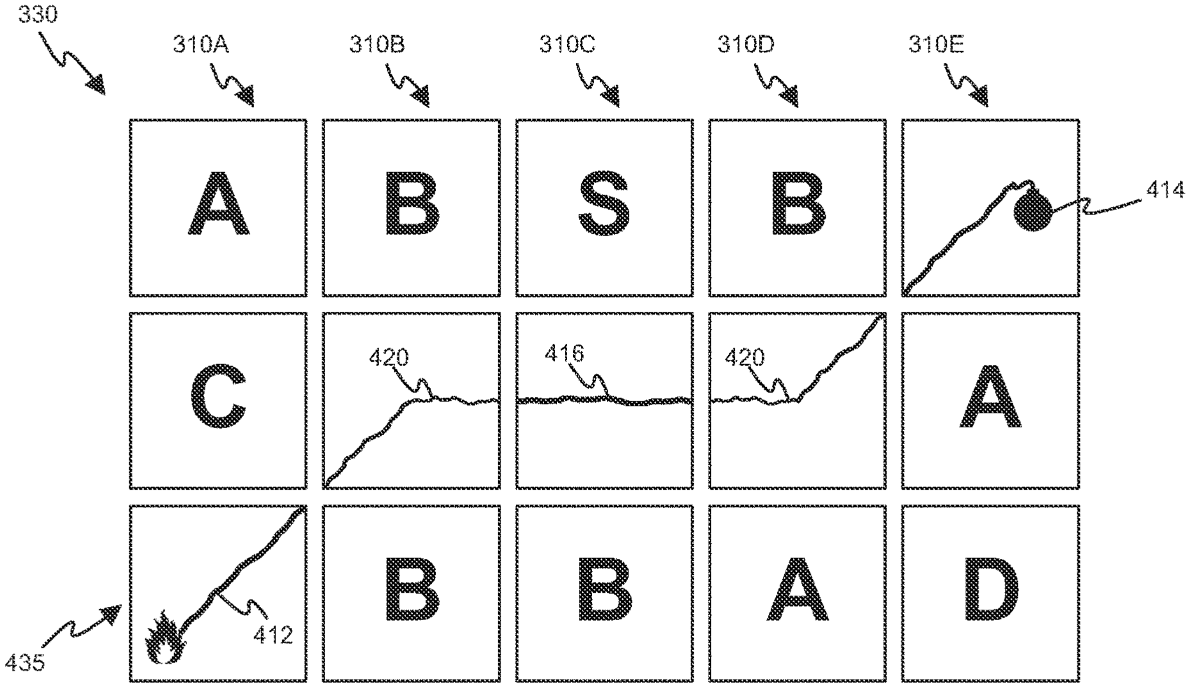
Figure 4H:
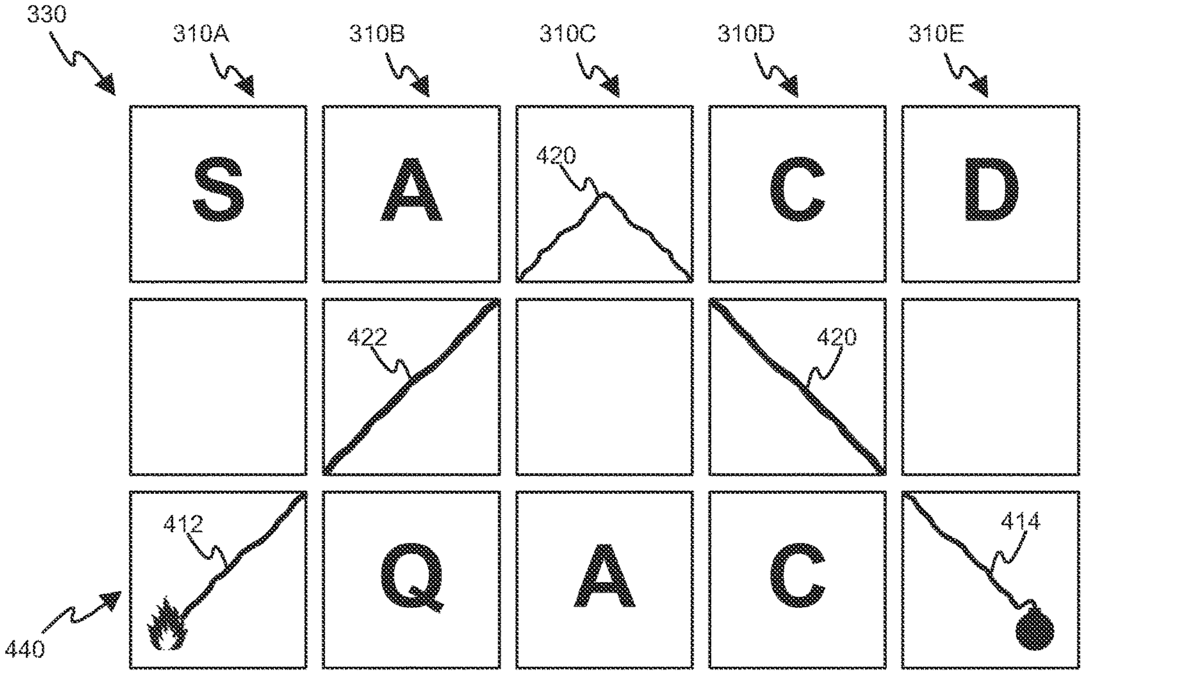
Figure 5A:
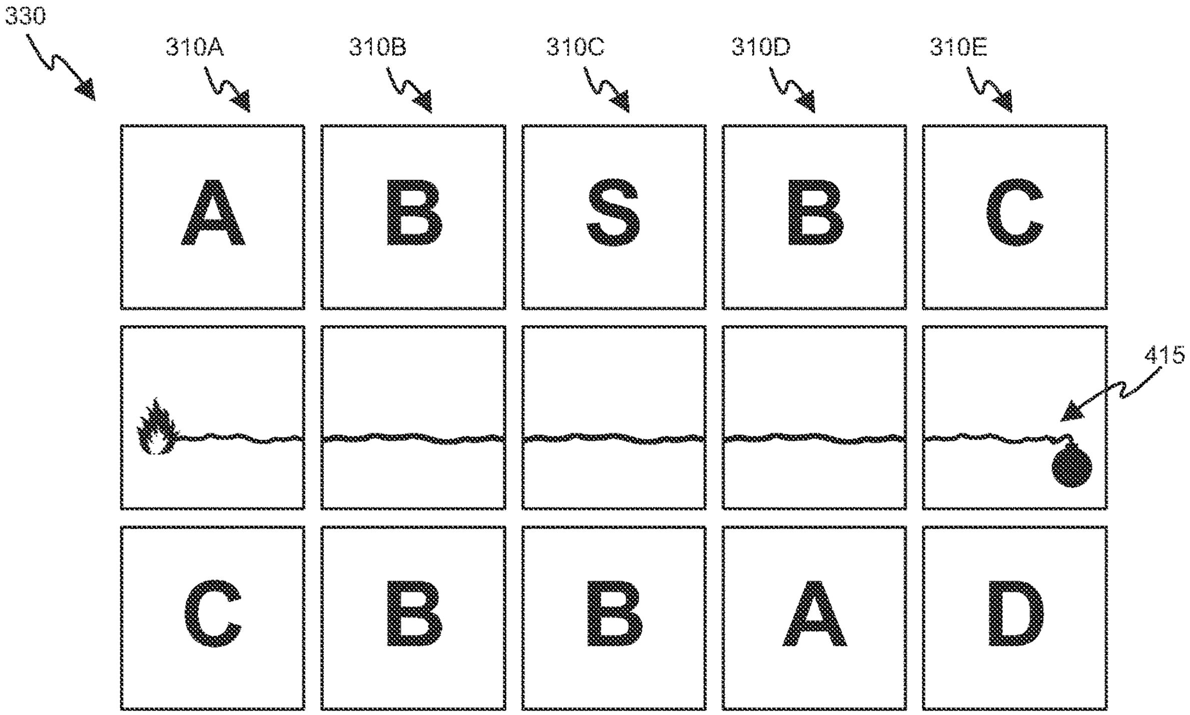
FIGS. 5A-5F are images of exemplary screens of a wagering game displayed on the EGM of FIG. 2 according to further aspects an embodiment the present disclosure.
Figure 5B:
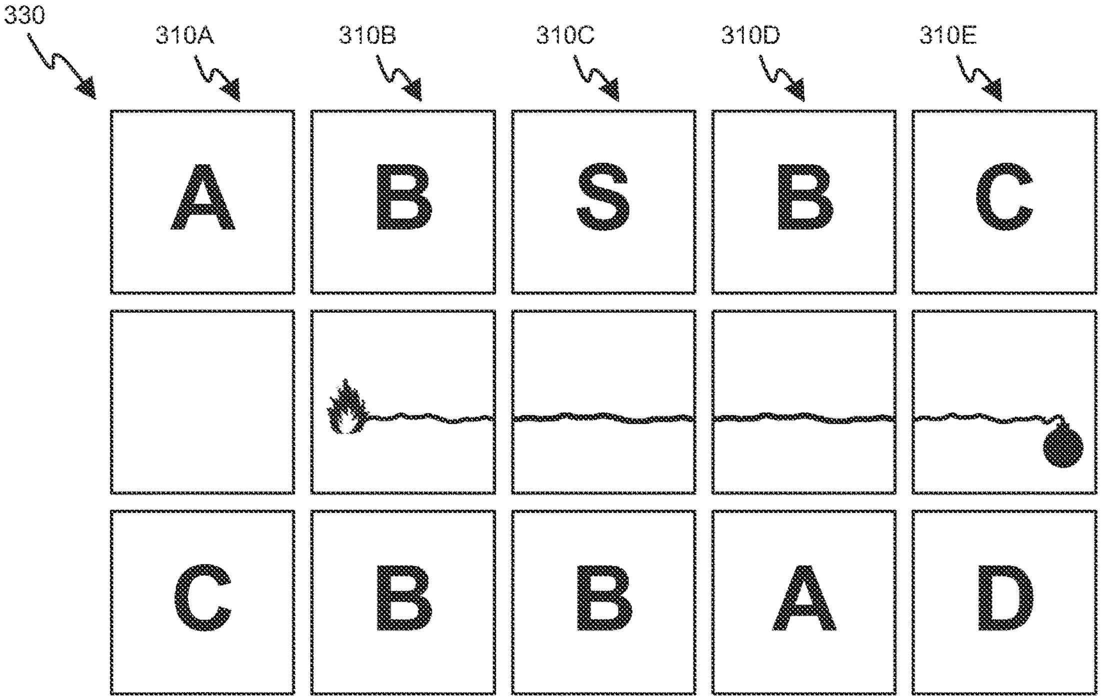
Figure 5C:
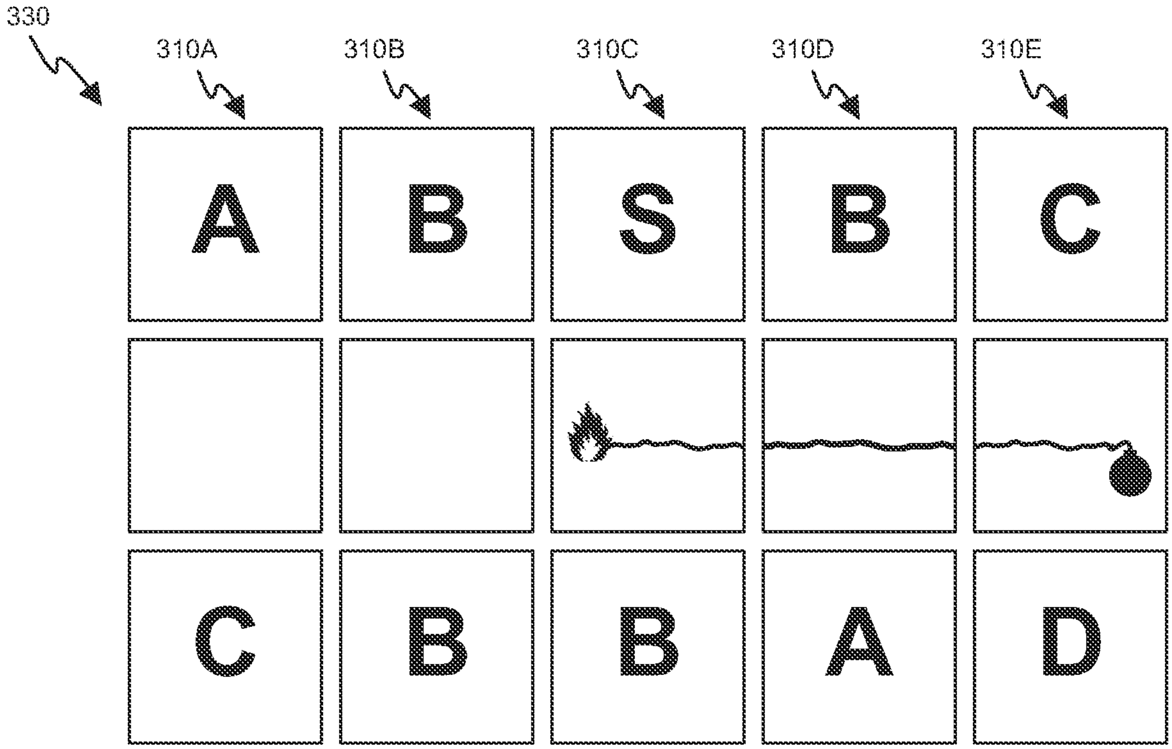
Figure 5D:
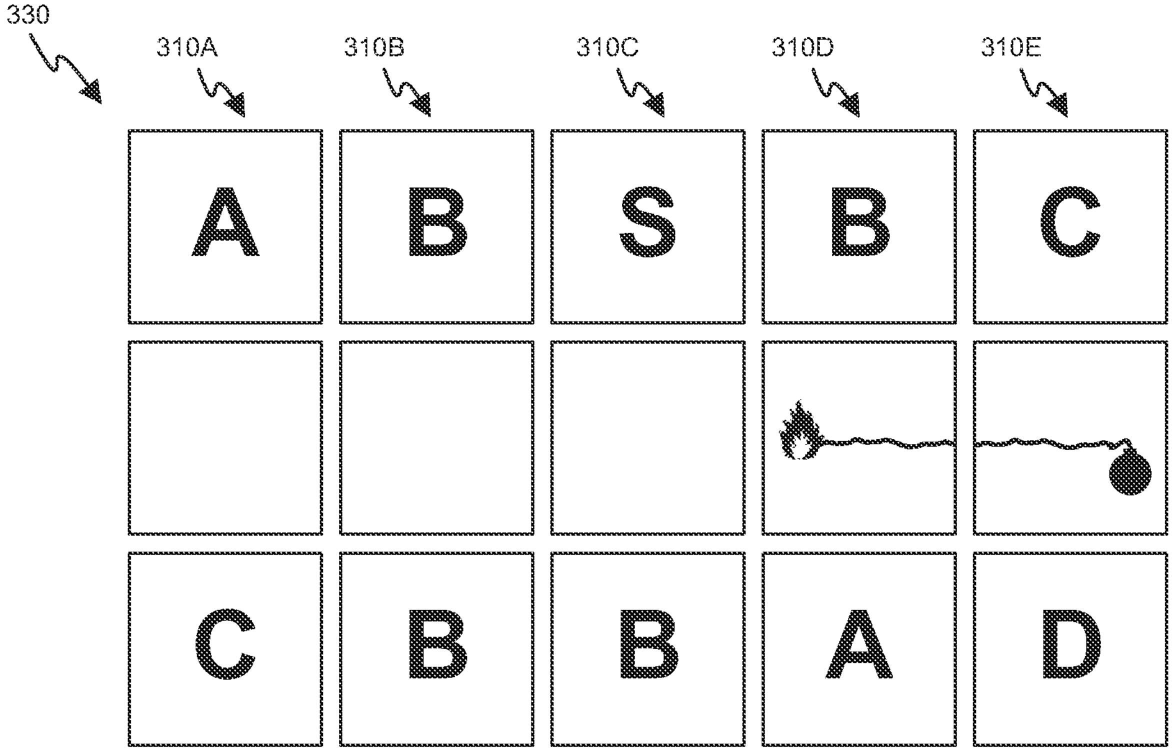
Figure 5E:
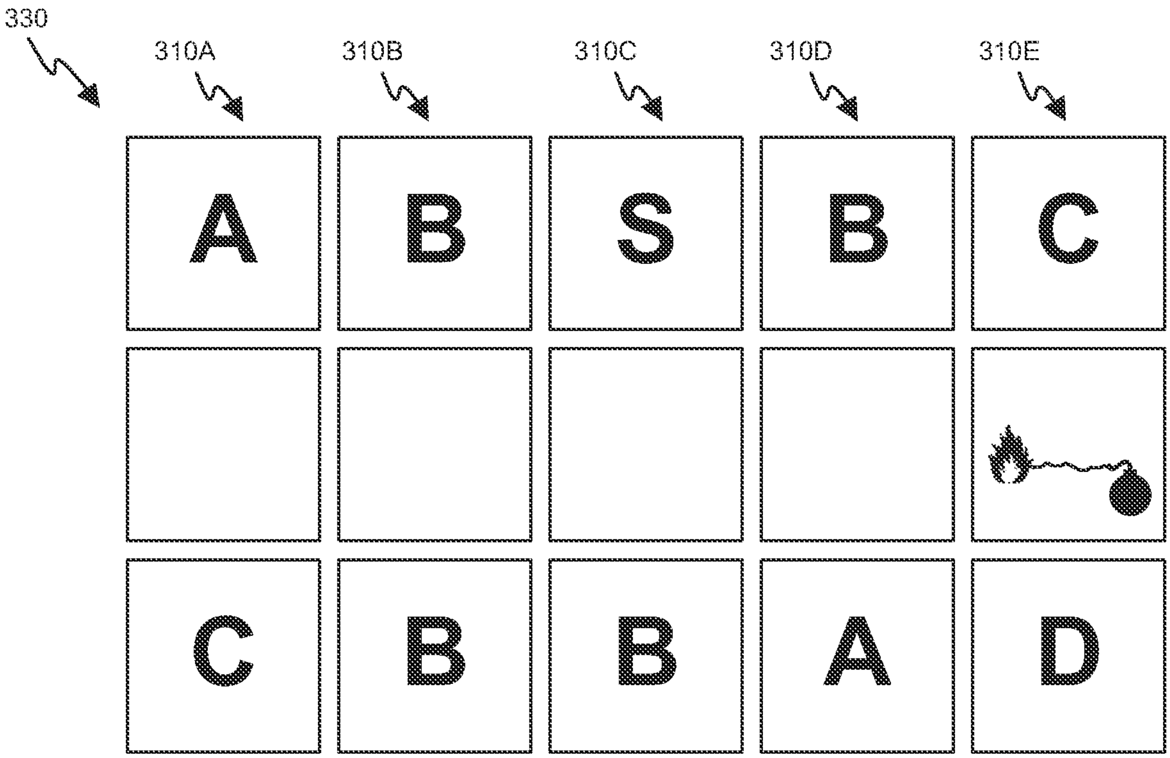
Figure 5F:
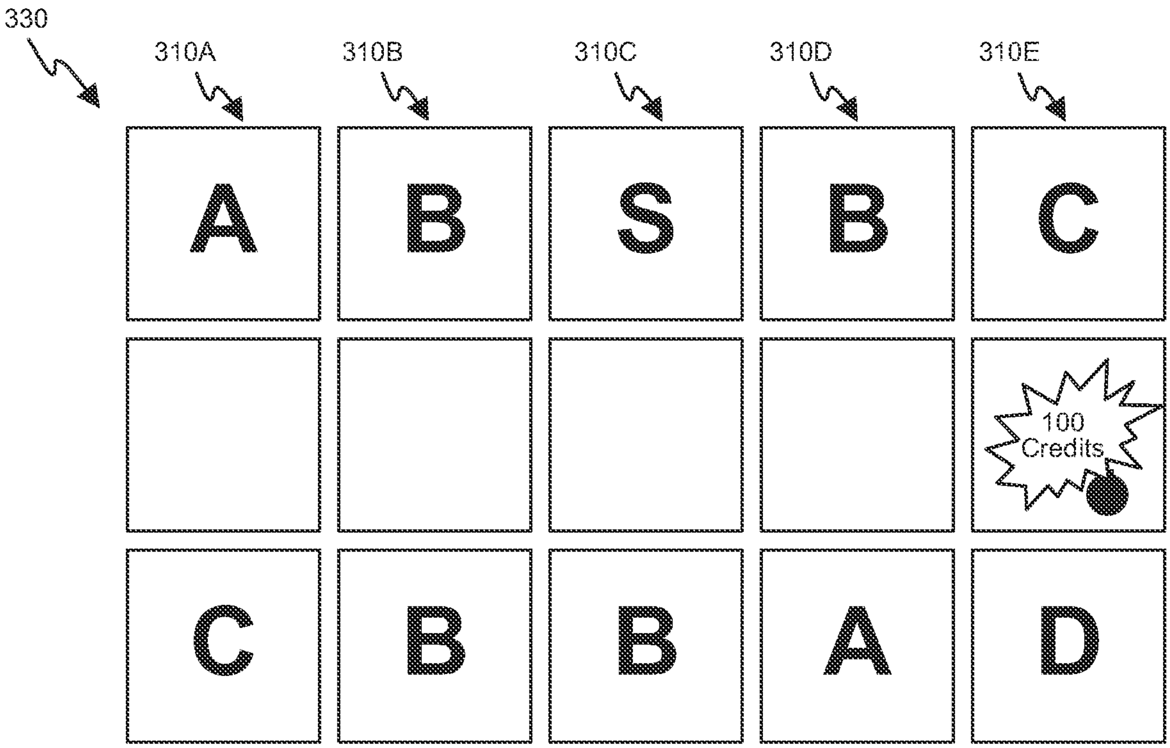

FIG. 4G illustrates another exemplary embodiment of a contiguous image 435. The contiguous image 435 is again illustrated as a plurality of fuse segments connected to a bomb but a variety of other themes could also be used. In this embodiment, the image segments forming the contiguous image 435 are positioned in multiple rows, whereas in the embodiment shown in FIG. 4C the image segments 310A-310E extended along a single row, e.g., the middle row of the symbol array 330.

FIG. 4H illustrates still another exemplary embodiment of a contiguous image 440. For illustration purposes, the contiguous image 440 is again shown as a plurality of fuse segments connected to a bomb. As with the embodiment of FIG. 4E, the image segments 445A-445E that form the contiguous image 440 in FIG. 4F are positioned in multiple rows.

Contiguous Image Animation

Turning now to FIGS. 5A-5F, an exemplary embodiment of an animation that may be used in connection with the contiguous image feature is described. The animation may be employed, for example, to display an award when a winning outcome occurs in response to the image segments being correctly positioned in the symbol array 330 to display the contiguous image, e.g., 415.

For example, in the embodiment shown in FIGS. 5A-5F, the contiguous image 415 is illustrated as a burning fuse that begins on the first, leftmost reel (or column) 410A and connects by fuse segments in the three middle reels (or columns) 410B-410D to a bomb that is positioned in the fifth, rightmost reel (or column) 310E. The animation may show the fuse burning across the screen, see, e.g., FIGS. 5A-5F, until it reaches the bomb, causing it to detonate and reveal an award, see, e.g., FIG. 5F.

Figure 6:
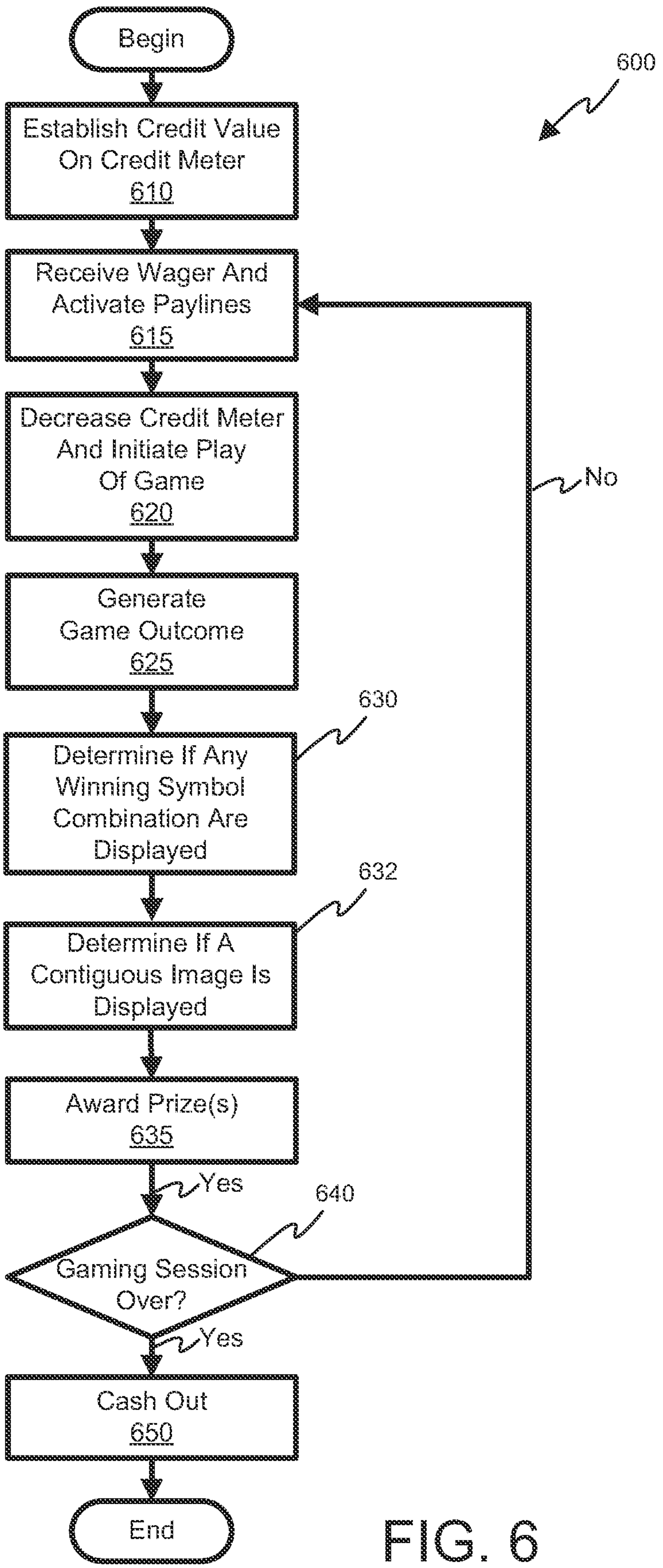
FIG. 6 is a flowchart for an example embodiment of process for operating the EGM of FIG. 2 in accordance with various aspects of the present disclosure.

Referring to FIG. 6, a flowchart is shown of a method 600 of playing a spinning reel game of gaming device 200 in accordance with the contiguous image features discussed above. While presented as a primary game or base game of method 600, the spinning reel game may also be implemented as a bonus game or secondary game of the gaming device 200.

At 610, the gaming device 200 may establish an associated credit value on a credit meter. To this end, a player may insert a physical item having monetary value into a credit input mechanism 210, such as the ticket reader 224, of the gaming device 200. In response to the received physical item, the gaming device 200 may increase a credit value of the credit meter based on the monetary value of the physical item.

At 615, the gaming device 200 may receive a wager and may activate one or more paylines 4001, 4002, 4003. In particular, a player may actuate one or more buttons 236 of the gaming device 200 to specify a value of a wager funded by the credit value of the credit meter. Furthermore, in some embodiments, the gaming device 200 may selectively activate a number of paylines 4001, 4002, 4003 based on the specified value of the wager. In other embodiments, the gaming device 200 may permit the player to specify via buttons 236 which paylines 4001, 4002, 4003 to activate and a value to wager on each activated paylines 4001, 4002, 4003.

After receiving the wager and activating one or more paylines 4001, 4002, 4003, the gaming device 200 at 620 may decrease the credit meter by the specified wager and initiate play of a spinning reel game. In particular, the gaming device 200 may initiate the spinning reel game by spinning reels 310A 310E in response to input received from the player. See, e.g., FIG. 4A. For example, the gaming device 200 may initiate play in response to the player pressing a button 208, pulling a handle, etc. of the gaming device 200.

At 625, the gaming device 200 may stop the reels 310A 310E based on one or more random values generated by RNG 212 to obtain a game outcome comprising an array of symbols. See, e.g., FIGS. 4B-4F. In other embodiments, the gaming device 200 may stop the reels 310A 310E based on information received from central determination gaming server 106.

The gaming device 200 at 630 may determine whether the array of symbols includes one or more winning symbol combination. For example, at 630 the gaming device may determine if there are any winning combinations of symbols along one of the activated paylines 4001, 4002, 4003.

Figure 7A:
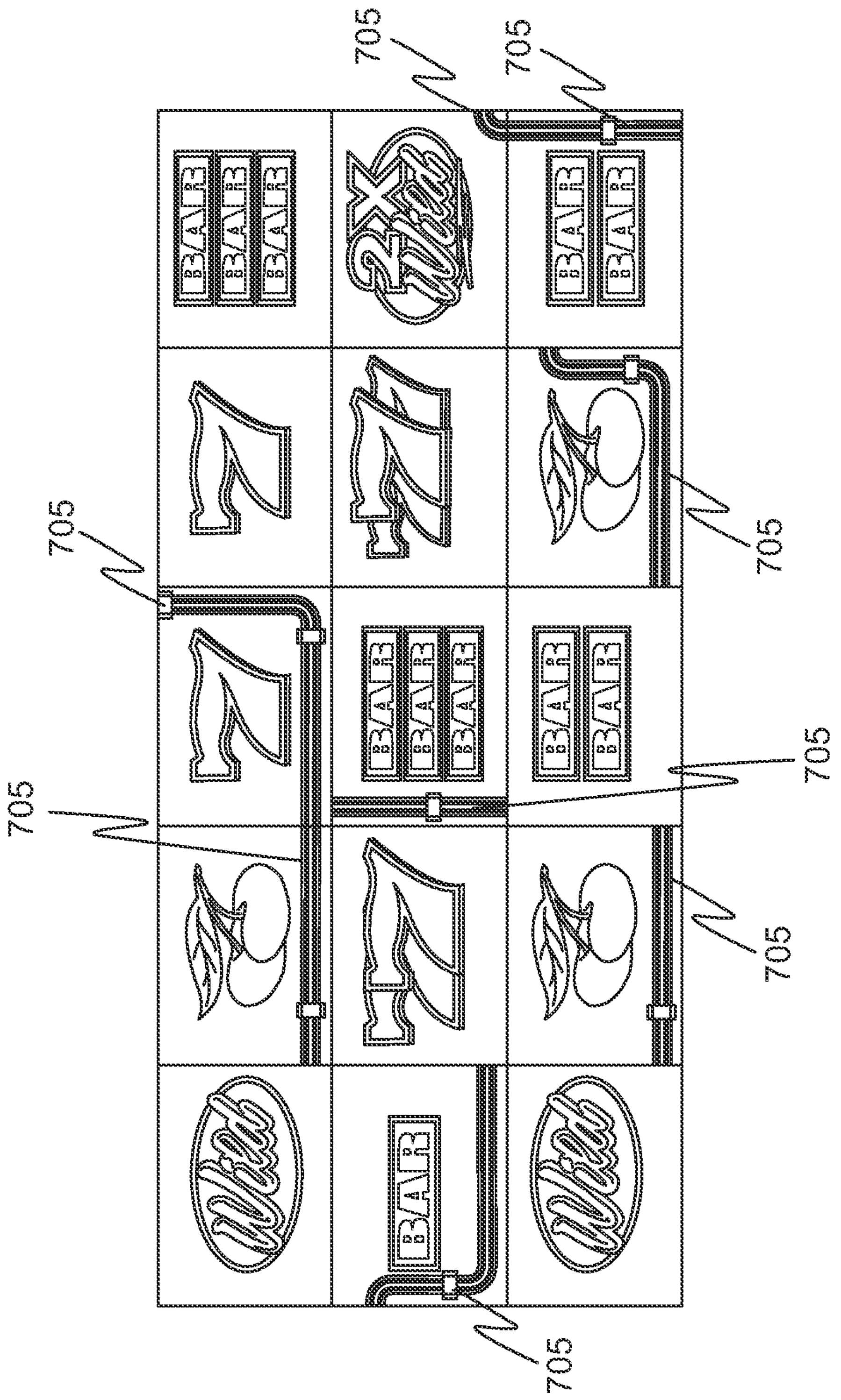
FIGS. 7A and 7B are images of exemplary screens of a wagering game displayed on the EGM of FIG. 2 according to another embodiment the present disclosure.
Figure 7B:
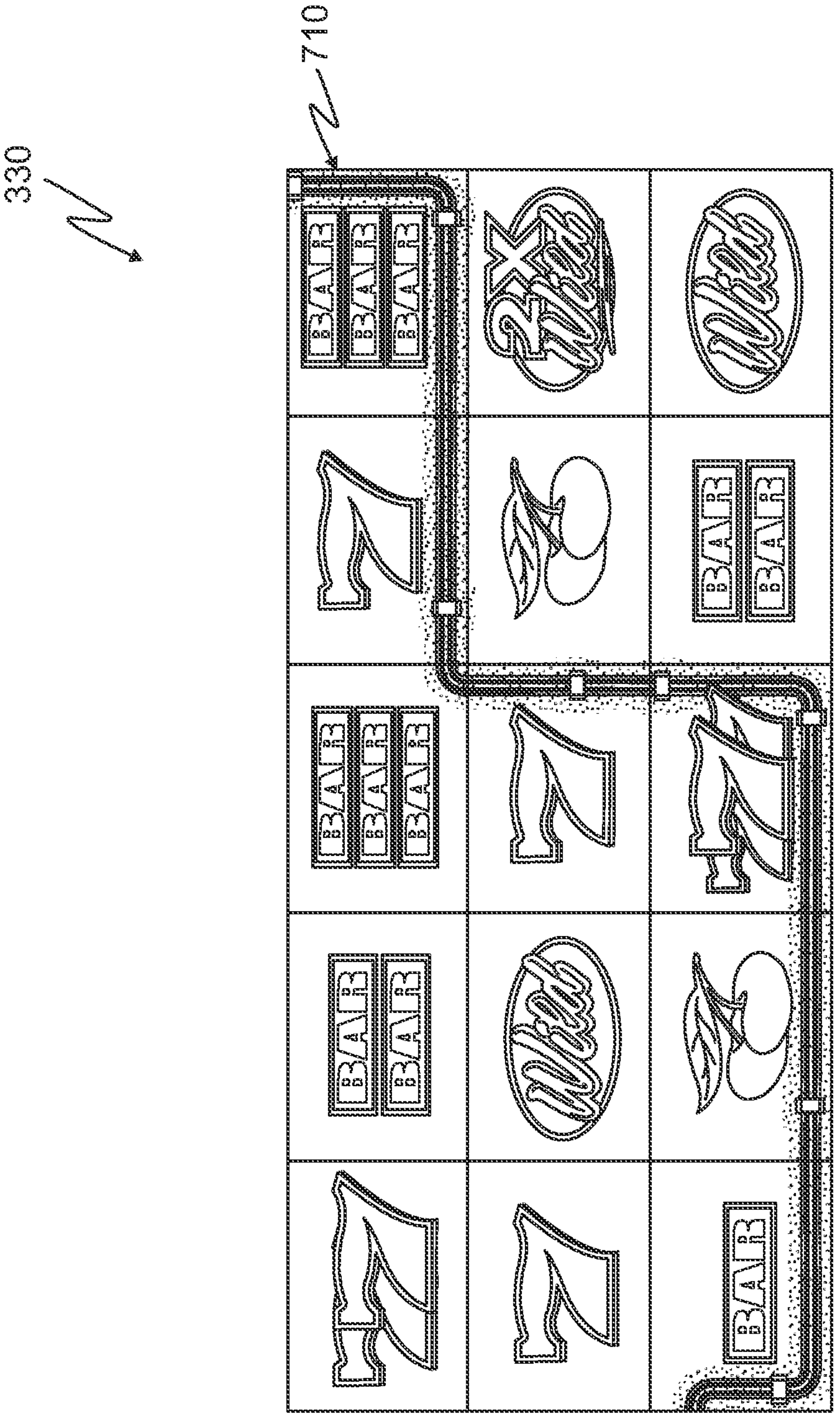

Next, at 632, the gaming device may determine the symbol array includes a plurality of image segments arranged to display a contiguous image (see, e.g., contiguous image 430 in FIG. 4C, contiguous image 432 in FIG. 4F, contiguous image 435 in FIG. 4G, contiguous image 440 in FIG. 4F, and contiguous image 710 in FIG. 7B).

At 635, the gaming device 200 may award a prize or prizes associated with any winning symbol combinations and/or contiguous images that were identified in 630 and 632 For example, a winning outcome based on a display of the contiguous image may result in variety of awards, including, for example, a fixed or variable amount of credits, a prize, such as a watch, a bonus game, etc. Similarly, winning symbol combinations along the activated paylines may result in the award of prize(s) by increasing the credit value of the credit meter based on the prize(s) for such winning combination(s).

At 645, the gaming device 200 may determine whether the game has been terminated. For example, the player may be entitled to a number of spins, in which case the gaming device may determine at 645 whether the player has any remaining spins. Alternatively, the player wishes to terminate the current gaming session. For example, the player may press a button 236 of the gaming device 200 to "cash out" and terminate the gaming session. If the gaming session has been terminated by the player or otherwise, the gaming device 200 at 650 may cash out any remaining credit value on the credit meter to the player via a credit output mechanism of the gaming device. For example, the gaming device 200 may transfer the remaining credit value by dispensing the appropriate number of coins via a coin tray or by printing a ticket with the appropriate monetary value via ticket printer 222. If the gaming session has not been terminated, the gaming device 200 may return to 615 to permit the player to adjust the wager and/or number of activated paylines 4001, 4002, 4003 or may return to 620 to permit the player to initiate play of another game using the current established wager and activated paylines 4001, 4002, 4003.

FIGS. 7A and 7B are images of exemplary screens of a wagering game displayed on the EGM of FIG. 2 according to another embodiment the present disclosure. In the embodiment depicted in FIGS. 7A and 7B, the display positions 310A1-310E3 of the symbol array 330 may simultaneously display both an image segment and game symbol (e.g., individual cards for a deck of playing cards, letters, cherries, bars, double bars, triple bars, sevens, wilds, scatter, etc.). In this embodiment, the image segments include a plurality of pipe image segments 705 that form a contiguous image 710, e.g., interconnected pipe segments extending across all of the reels, when the image segments are displayed in a predetermined arrangement on the array of symbol positions. FIG. 7A shows the screen array 330 in instances in which image segments are displayed without forming a contiguous image. As a result, although winning outcomes might be paid based on game symbol combinations, no winning outcome would be awarded in these instances based on the contiguous image feature. FIG. 7B shows the screen array 330 in instances in which the displayed symbols include the image segments arranged to display the contiguous image 710 on the array, which may result in an award of credits, for example.

Numerous embodiments are described in this disclosure and are presented for illustrative purposes only. The described embodiments are not, and are not intended to be, limiting in any sense. One of ordinary skill in the art will recognize that the disclosed embodiments may be practiced with various modifications and alterations, such as structural, logical, software, and electrical modifications. Although aspects of the present disclosure may be described with reference to one or more particular embodiments and/or drawings, it should be understood that such aspects are not limited to usage in the one or more particular embodiments or drawings unless expressly specified otherwise.

The present disclosure describes only exemplary embodiments. Modifications of the above disclosed apparatus and methods which fall within the scope of the appended claims will be readily apparent to those of ordinary skill in the art. For example, although the examples discussed above are illustrated for a gaming market, embodiments of the disclosure can be implemented for other markets.

Accordingly, while the present disclosure has set forth various exemplary embodiments, other embodiments may fall within the spirit and scope of the following claims.

What is claimed is:

1. A gaming system comprising:

at least one server operable to determine a randomly generated outcome based on a random number generator meeting a return-to-player; and a client device coupled to the at least one server and having a plurality of display positions arranged in a plurality of rows and a plurality of columns, a device processor and memory storing a symbol set, the symbol set including game symbols, some of the game symbols having a plurality of image segments, a contiguous image being formable from a subset of the plurality of image segments, and instructions, which, when executed, cause the device processor to at least:

receive data indicative of the randomly generated outcome from the server, control the display positions to display a subset of game symbols selected including the contiguous image initially occupying the plurality of columns based on the data received from the server, control the display positions to animate the contiguous image from being displayed in the plurality of columns to occupying a decreased number of columns thus decreasing the contiguous image to a decreased image, and responsive to the decreased image being occupied in a single display position, control the single display position to animate an award over the decreased image to meet the return-to-player.

2. The gaming system of claim 1, wherein the plurality of columns comprise N columns, and wherein the contiguous image is formed when a plurality of N image segments are displayed in a predefined order with each of the N image segments being displayed in a different one of the plurality of columns.

3. The gaming system of claim 2, wherein the instructions, when executed, further cause the device processor to form the contiguous image when the plurality of N image segments are displayed in the predefined order across one row of the plurality of rows.

4. The gaming system of claim 1, wherein the instructions, when executed, further cause the display positions to animate the contiguous image decreasing sequentially across the plurality of columns from a leftmost image segment to a rightmost image segment while modifying the contiguous image.

5. The gaming system of claim 1, wherein the instructions, when executed, further cause the device processor to determine whether the subset of game symbols displayed include a winning symbol combination.

6. The gaming system of claim 1, wherein the award is a first award, and wherein the instructions, when executed, further cause the device processor to evaluate the subset of game symbols at the contiguous image for a second award.

7. The gaming system of claim 6, wherein the instructions, when executed, further cause the device processor to present both the first award and the second award.

8. A method of presenting an award on an electronic gaming system having at least one server coupled to a client device, the at least one server operable to obtain a randomly generated outcome based on a random number generator meeting a return-to-player, the client device coupled to the at least one server and having a plurality of display positions arranged in a plurality of rows and a plurality of columns, a device processor and memory storing a symbol set, the symbol set including game symbols, some of the game symbols having a plurality of image segments, a subset of the plurality of image segments forming a contiguous image, the method comprising:

transmitting data indicative of the outcome from the at least one server to the client device;

causing the client device to display a subset of game symbols selected including the contiguous image initially occupying the plurality of columns based on the data received;

causing the client device to animate the contiguous image from being displayed in the plurality of columns to being displayed in a decreased number of columns; and when the decreased number of columns reaches a single column, revealing the award at a first display position in the single column to meet the return-to-player.

9. The method of claim 8, wherein the plurality of columns comprise N columns, and wherein the contiguous image is formed when a plurality of N image segments are displayed in a predefined order with each of the N image segments being displayed in a different one of the plurality of columns.

10. The method of claim 9, further comprising forming the contiguous image when the plurality of N image segments are displayed in the predefined order across one row of the plurality of rows.

11. The method of claim 8, further comprising animating on the client device the contiguous image being reduced sequentially across the plurality of columns from a leftmost image segment to a rightmost image segment while modifying the contiguous image.

12. The method of claim 8, further comprising determining whether the subset of game symbols displayed includes a winning symbol combination.

13. The method of claim 8, wherein the award is a first award, further comprising evaluating the subset of game symbols at the contiguous image for a second award.

14. The method of claim 13, further comprising awarding both the first award and the second award.

15. A non-transitory computer-readable medium comprising a symbol set, the symbol set including game symbols, some of the game symbols having a plurality of image segments, a subset of the plurality of image segments forming a contiguous image, and a plurality of device instructions in a client device that comprises a device processor and having a plurality of display positions arranged in a plurality of rows and a plurality of columns, the client device being networked to at least one server, the at least one server operable to randomly determine an outcome meeting a return-to-player, and the device instructions, which, when executed, cause the device processor to perform the steps of:

receiving data indicative of the outcome from the server;

displaying on the client device a subset of game symbols selected including the contiguous image initially occupying the plurality of columns based on the data received from the server;

animating on the client device the contiguous image from being displayed in a subset of display positions in the plurality of columns to being displayed in a decreased subset of display positions in a decreased number of columns; and responsive to the subset of display positions including a single display position, animating an award over the single display position to meet the return-to-player.

16. The non-transitory computer-readable medium of claim 15, wherein the plurality of columns comprise N columns, and wherein the contiguous image is formed when a plurality of N image segments are displayed in a predefined order with each of the N image segments being displayed in a different one of the plurality of columns.

17. The non-transitory computer-readable medium of claim 16, wherein the device instructions, when executed, further cause the device processor to perform the step of forming the contiguous image when the plurality of N image segments are displayed in the predefined order across one row of the plurality of rows.

18. The non-transitory computer-readable medium of claim 15, wherein the device instructions, when executed, further cause the device processor to perform the step of animating on the display positions the contiguous image being reduced sequentially across the plurality of columns from a leftmost image segment to a rightmost image segment while modifying the contiguous image.

19. The non-transitory computer-readable medium of claim 15, wherein the device instructions, when executed, further cause the device processor to perform the step of determining whether the subset of game symbols displayed includes a winning symbol combination.

20. The non-transitory computer-readable medium of claim 15, wherein the award is a first award, wherein the device instructions, when executed, further cause the device processor to perform the step of evaluating the subset of game symbols at the contiguous image for a second award.

* * * * *